United States Patent
Dai et al.

(10) Patent No.: US 11,660,838 B2
(45) Date of Patent: May 30, 2023

(54) THERMAL INSULATION COMPONENTS AND METHODS OF MANUFACTURING THERMAL INSULATION COMPONENTS

(71) Applicant: GM GLOBAL TECHNOLOGY OPERATIONS LLC, Detroit, MI (US)

(72) Inventors: Fang Dai, Troy, MI (US); Mei Cai, Bloomfield Hills, MI (US); Fan Xu, Oakland Township, MI (US); Tao Wang, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 595 days.

(21) Appl. No.: 16/725,807

(22) Filed: Dec. 23, 2019

(65) Prior Publication Data
US 2021/0187903 A1 Jun. 24, 2021

(51) Int. Cl.
| | |
|---|---|
| *H01M 10/658* | (2014.01) |
| *B32B 7/12* | (2006.01) |
| *B32B 15/14* | (2006.01) |
| *B32B 5/02* | (2006.01) |
| *B32B 19/04* | (2006.01) |
| *C08G 77/04* | (2006.01) |
| *B32B 27/12* | (2006.01) |
| *H01M 50/24* | (2021.01) |
| *H01G 11/78* | (2013.01) |
| *C08L 83/04* | (2006.01) |
| *H01G 11/18* | (2013.01) |
| *C08G 77/20* | (2006.01) |
| *C08J 3/24* | (2006.01) |

(52) U.S. Cl.
CPC .............. *B32B 7/12* (2013.01); *B32B 5/024* (2013.01); *B32B 15/14* (2013.01); *B32B 19/041* (2013.01); *B32B 27/12* (2013.01); *C08G 77/04* (2013.01); *C08L 83/04* (2013.01); *H01G 11/18* (2013.01); *H01G 11/78* (2013.01); *H01M 10/658* (2015.04); *H01M 50/24* (2021.01); *C08G 77/20* (2013.01); *C08J 3/24* (2013.01); *Y02E 60/10* (2013.01)

(58) Field of Classification Search
CPC .. C08K 5/14; C08K 5/23; C08L 33/10; C08L 83/04; C08L 25/06; H01M 10/658; H01G 11/78; C08G 18/06; C08G 18/14; C08F 210/06
See application file for complete search history.

(56) References Cited

U.S. PATENT DOCUMENTS

| | | |
|---|---|---|
| 8,658,299 B2 | 2/2014 | Yang et al. |
| 2007/0004815 A1 | 1/2007 | Narayan-Sarathy et al. |
| 2012/0022175 A1* | 1/2012 | Sakamoto .................. C08J 9/18 521/146 |
| 2017/0062784 A1 | 3/2017 | Kia et al. |
| 2017/0365824 A1 | 12/2017 | Berger et al. |

FOREIGN PATENT DOCUMENTS

| | | |
|---|---|---|
| CN | 101213073 A | 7/2008 |
| CN | 113087933 A | 7/2021 |
| DE | 102004053374 A1 | 5/2006 |
| DE | 102020131985 A1 | 6/2021 |
| EP | 1882715 A1 | 1/2008 |
| JP | H11170447 A | 6/1999 |
| JP | 4302210 B2 * | 7/2009 |

OTHER PUBLICATIONS

JP4302210 B2 machine translation (2009).*
Sachdev, Anil K. et al, U.S. Appl. No. 16/294,449, filed Mar. 6, 2019 entitled, "Composite Assemblies for Thermal Cooling of Electronic Components," 50 pages.
First Office Action for German Patent Application No. 10 2020 131 985.1 dated Nov. 4, 2022, with correspondence from Manitz Finsterwald Patent- und Rechtsanwaltspartnerschaft mbB summarizing Office Action; 5 pages.
First Office Action for China Patent Application No. 202011536481.X dated Apr. 12, 2023, with correspondence from China Patent Agent (H.K.) Ltd. summarizing Office Action; 8 pages.

* cited by examiner

*Primary Examiner* — Kuo Liang Peng
(74) *Attorney, Agent, or Firm* — Harness, Dickey & Pierce, P.L.C.

(57) ABSTRACT

A thermal insulation component according to various aspects of the present disclosure includes a matrix, a crosslinking precursor, and a crosslinking initiator. The matrix includes a thermal insulation material having a thermal conductivity of less than or equal to about 5 W/mK. The crosslinking precursor is embedded in the matrix. The crosslinking precursor includes at least one of an acrylate functional group or a methacrylate functional group. The crosslinking initiator is embedded in the matrix. The crosslinking initiator is configured to decompose to initiate crosslinking of the crosslinking precursor. In certain aspects, the present disclosure also provides an electronics assembly including an electronic component and a thermal insulation material in thermal communication with the electronic component. In certain aspects, the present disclosure also provides methods of manufacturing the thermal insulation component.

20 Claims, 3 Drawing Sheets

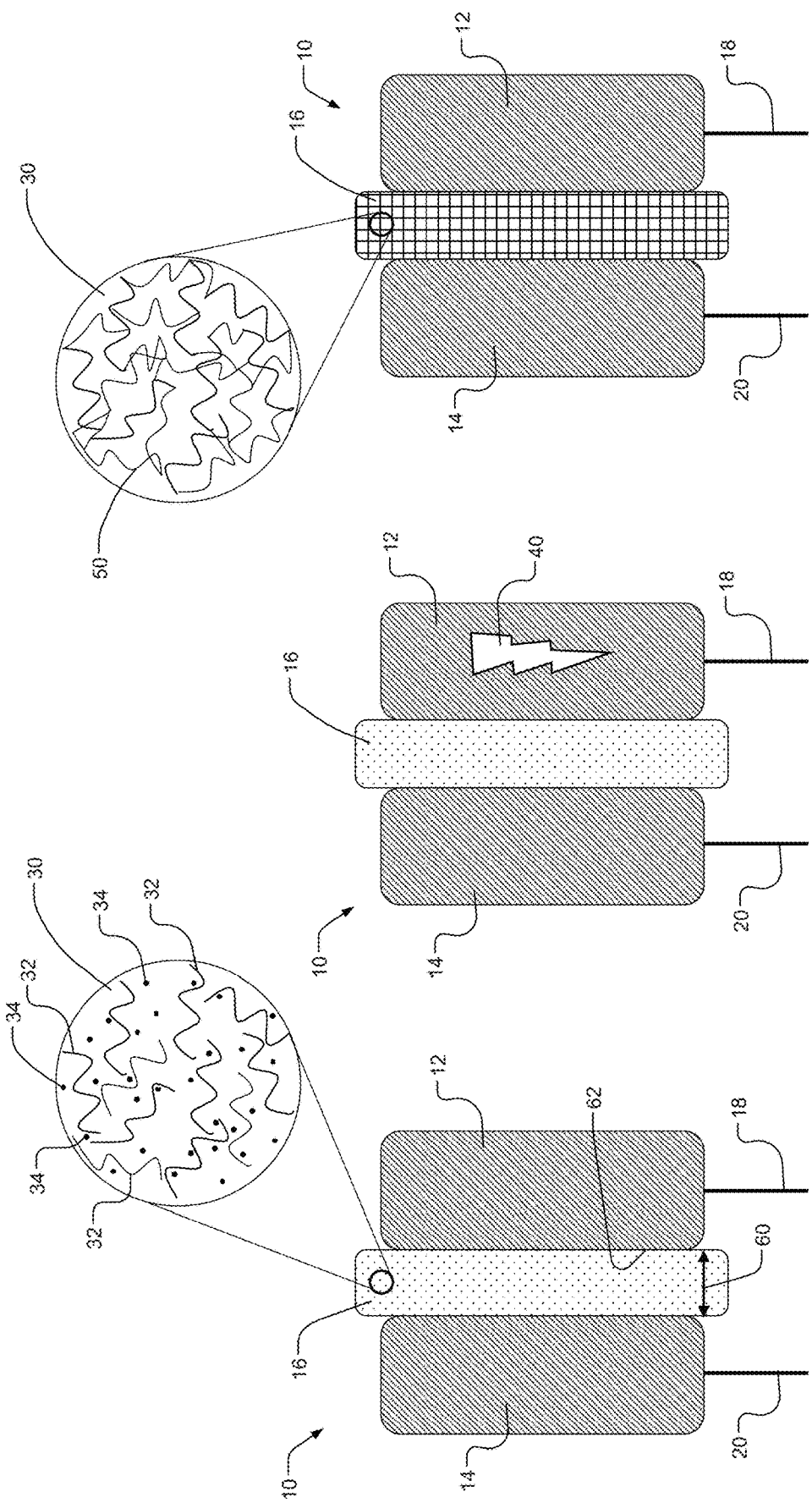

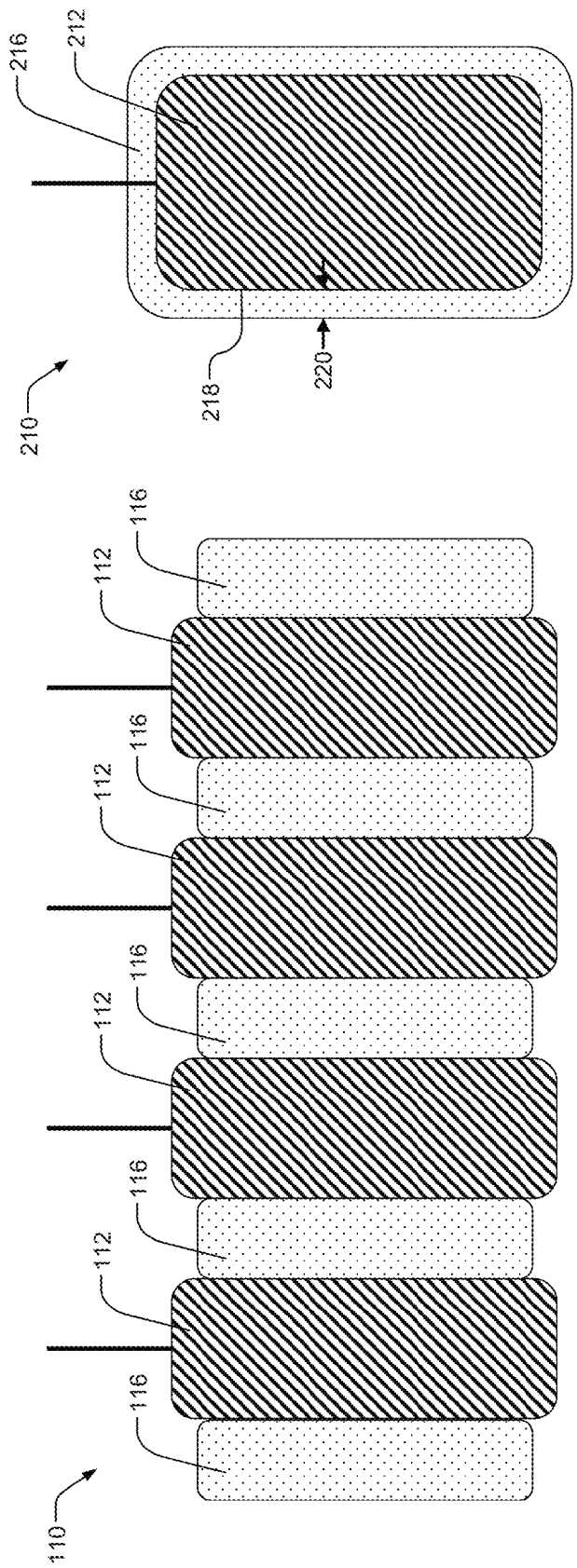

THERMAL INSULATION COMPONENTS AND METHODS OF MANUFACTURING THERMAL INSULATION COMPONENTS

INTRODUCTION

This section provides background information related to the present disclosure which is not necessarily prior art.

The present disclosure relates to thermal insulation components for electronic assemblies and methods of manufacturing thermal insulation components.

Vehicles include various types of electronic components. Electronic components typically generate heat during normal operating conditions. However, electronic components are desirably maintained within predetermined temperature ranges for optimum performance and to maximize component life. Electronic components may be maintained within a predetermined temperature range by using cooling systems and/or thermal insulation.

SUMMARY

This section provides a general summary of the disclosure, and is not a comprehensive disclosure of its full scope or all of its features.

In various aspects, the present disclosure provides a thermal insulation component. The thermal insulation component includes a matrix, a crosslinking precursor, and a crosslinking initiator. The matrix includes a thermal insulation material having a thermal conductivity of less than or equal to about 5 W/mK. The crosslinking precursor is embedded in the matrix. The crosslinking precursor includes at least one of an acrylate functional group or a methacrylate functional group. The crosslinking initiator is embedded in the matrix. The crosslinking initiator is configured to decompose to initiate crosslinking of the crosslinking precursor.

In one aspect, the crosslinking precursor includes a linear molecule selected from the group consisting of: a methacryloxypropyl terminated polydimethylsiloxane (PDMS), an acryloxypropyl terminated PDMS, a poly(ethylene glycol) diacrylate, a poly(ethylene glycol) dimethacrylate, 1,10-decanediol diacrylate, 1,10-decanediol dimethacrylate, ethoxylated bisphenol A diacrylate, ethoxylated bisphenol A dimethacrylate, a urethane acrylate, a urethane methacrylate, an epoxy acrylate, an epoxy methacrylate, or any combination thereof.

In one aspect, the crosslinking precursor includes a branched monomer selected from the group consisting of: an ethoxylated trimethylolpropane triacrylate, trimethylolpropane trimethacrylate, an alkyloyl-modified dipentaerythritol triacrylate, an ethoxylated glycerin triacrylate, an ethoxylated pentaerythritol tetraacrylate, or any combination thereof.

In one aspect, the crosslinking precursor includes a branched oligomer selected from the group consisting of: an ethoxylated trimethylolpropane triacrylate, an ethoxylated glycerin triacrylate, an ethoxylated pentaerythritol tetraacrylate, or any combination thereof.

In one aspect, the crosslinking initiator includes an azo initiator selected from the group consisting of: 2,2'-azobis(isobutyronitrile), 4,4'-azobis(4-cyanovaleric acid), 2,2'-azobis[2-methyl-N-(2-hydroxyethyl)propionamide], 4-azobis(4-cyanovaleric acid) polymer with alpha,omega-bis(3-aminopropyl)polydimethylsiloxane, or any combination thereof.

In one aspect, the crosslinking initiator is a peroxide initiator selected form the group consisting of: tert-butyl peroxide, dicumyl peroxide, 2,4-pentanedione peroxide, or any combination thereof.

In one aspect, the crosslinking precursor includes a poly(ethylene glycol) diacrylate having a number average molecular weight of greater than or equal to about 3 to less than or equal to about 1,000 and the crosslinking initiator includes 2,2'-azobis(isobutyronitrile).

In one aspect, the crosslinking initiator has a ten-hour-half-life temperature of greater than or equal to about 50° C. to less than or equal to about 120° C.

In one aspect, the crosslinking precursor is present in an amount greater than or equal to about 5% to less than or equal to about 50% by weight of the thermal insulating material.

In one aspect, the crosslinking initiator is present in an amount greater than or equal to about 0.5% to less than or equal to about 5% by weight of the crosslinking precursor.

In one aspect, the thermal insulation material includes fiberglass, mineral wool, cellulose, polyurethane, polystyrene, polypropylene, silicone rubber, or any combination thereof.

In various aspects, the present disclosure provides an electronics assembly including an electronic component and a thermal insulation component. The thermal insulation component is in thermal communication with the electronic component. The thermal insulation component includes a matrix, a crosslinking precursor, and a crosslinking initiator. The matrix includes a thermal insulation material having a thermal conductivity of less than or equal to about 5 W/mK. The crosslinking precursor is embedded in the matrix. The crosslinking precursor includes at least one of an acrylate functional group or a methacrylate functional group. The crosslinking initiator is embedded in the matrix. The crosslinking initiator is configured to decompose to initiate crosslinking of the crosslinking precursor.

In one aspect, the thermal insulation component has a thickness of greater than or equal to about 1 mm to less than or equal to about 1 cm.

In one aspect, the electronic component includes an electrochemical cell. The thermal insulation material includes polyurethane. The crosslinking precursor includes a poly(ethylene glycol) diacrylate having a number average molecular weight of greater than or equal to about 3 to less than or equal to about 1,000. The initiator includes 2,2'-azobis(isobutyronitrile).

In various aspects, the present disclosure provides a method of manufacturing a thermal insulation component. The method includes embedding a crosslinking precursor and a crosslinking initiator in a matrix including a thermally-insulating material. The method further includes, during the embedding, maintaining the crosslinking initiator at a temperature of less than or equal to a ten-hour-half-life temperature of the crosslinking initiator.

In one aspect, the method further includes forming the matrix.

In one aspect, the forming is performed concurrently with the embedding.

In one aspect, the method further includes, prior to the embedding, forming a solution by dissolving the crosslinking precursor and the crosslinking initiator in a solvent. The method further includes, after the embedding, removing the solvent from the matrix.

In one aspect, the embedding includes absorbing the solution in the matrix.

In one aspect, the ten-hour-half-life temperature is greater than or equal to about 50° C. to less than or equal to about 120° C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1C are related to an electronics assembly including a thermal insulation component according to various aspects of the present disclosure;

FIG. 1A is a schematic view of the electronics assembly with the thermal insulation component in an first state; FIG. 1B is a schematic view of the electronics assembly during a heat-generating event; FIG. 1C is a schematic view of the electronics assembly with the thermal insulation component in a second state;

FIG. 2 is a schematic view of another electronics assembly according to various aspects of the present disclosure;

FIG. 3 is a sectional view of yet another electronics assembly according to various aspects of the present disclosure.

Corresponding reference numerals indicate corresponding parts throughout the several views of the drawings.

DETAILED DESCRIPTION

Figure 4:
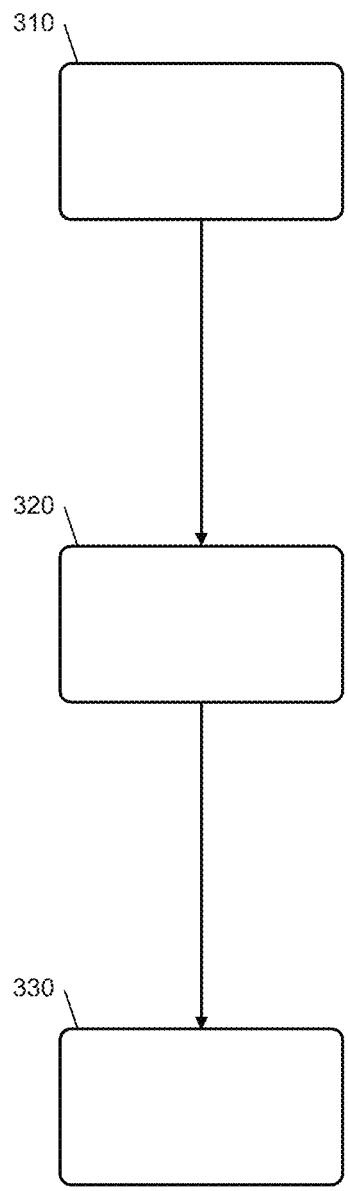
FIG. 4 is a flowchart depicting a method of manufacturing a thermal insulation component according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As discussed above, electronic components may generate heat during normal operation. In extenuating circumstances, electronic components may experience heat-generating events that cause a substantial increase in temperature of the component beyond the normal operating temperature, thereby also potentially heating nearby components. The substantial temperature increase may lead to decreased performance and/or decreased component life.

In various aspects, the present disclosure provides a thermal insulation component for an electronics assembly. The thermal insulation component provides thermal insulation in normal operating conditions and "on-demand" insulation and physical protection in response to a heat-generating event. The present disclosure also provides, in various aspects, methods of manufacturing thermal insulation components, as described in detail below (see discussion accompanying FIG. 4).

The thermal insulation component according to various aspects of the present disclosure, which may be in thermal contact with at least one electronic component, includes a matrix of thermally-insulating material having a crosslinking precursor and a crosslinking initiator dispersed therein. During normal operating conditions (e.g., normal operating temperatures), the crosslinking precursor remains uncrosslinked and the thermal insulation material has a first hardness. Upon exceeding a predetermined temperature, the initiator decomposes in an endothermic process to initiate crosslinking of the precursor. After crosslinking, the thermal insulation material has a second hardness greater than the first hardness. The second hardness may provide additional pressure tolerance that can facilitate improved physical insulation compared to the thermal insulation component in the first state.

With reference to FIG. 1A, an electronics assembly 10 according to various aspects of the present disclosure is provided. The electronics assembly 10 includes a first electronic component 12, a second electronic component 14 (collectively referred to as "the electronic components 12, 14"), and a thermal insulation component 16 disposed between the electronic components 12, 14. The thermal insulation component 16 is in thermal communication with the electronic components 12, 14. In certain aspects, an electronics assembly may include a single electronic component in thermal communication with a thermal insulation component (see, e.g., electronics assembly 210 of FIG. 3).

The first and second electronic components 12, 14 may include first and second electrical connectors 18, 20, respectively.

The electronic components 12, 14 may be any powered components that generate heat during normal operation and/or may undergo substantial temperature changes in a heat-generating event. For example, the electronic components 12, 14 may be independently selected from an electrochemical cell (e.g., a battery), a resistor, a capacitor, an inductor, a processor, an engine control unit, a high-powered electronics module (e.g., a metal-oxide-semiconductor field-effect transistor (MOSFET), an insulated-gate bipolar transistor (IGBT)), a motor component, a portion of a motor component, an internal combustion engine, or a portion of an internal combustion engine. In certain aspects, the electronic components 12, 14 may both be electrochemical cells. When the electronic components 12, 14 are electrochemical cells, the heat-generating event may be a potential internal short, by way of example. Other heat-generating events may include environmental temperature changes, including unanticipated temperature fluctuation in adjacent components, for example.

In certain aspects, the thermal insulation component 16 may be in the form of a pad, as shown in FIGS. 1A-1C. Accordingly, the thermal insulation component 16 may act as a physical and thermal barrier without completely surrounding the first electronic component 12 and/or the second electronic component 14. In various alternative aspects, a thermal insulation component may be in a form of a housing that at least partially surrounds an electronic component (see, e.g., thermal insulation component 216 of FIG. 3). The thermal insulation component 16 may be in direct contact or indirect contact with the first and second electronic components 12, 14.

The thermal insulation component 16 provides thermal insulation between the electronic components 12, 14 during normal operation of the electronic components 12, 14. Additionally, the thermal insulation component 16 is configured to provide "on-demand" thermal insulation and physical protection in response to a heat-generating event. The thermal insulation component 16 includes a matrix 30, a crosslinking precursor 32, and a crosslinking initiator 34. The precursor 32 and initiator 34 may be dispersed and embedded in the matrix 30. The precursor 32 and initiator 34 may be in the form of solid particles. In certain aspects, the particles may have an average particle size of greater than or equal to about 10 nm to less than or equal to about 1 µm (e.g., greater than or equal to about 10 nm to less than or equal to about 100 nm, greater than or equal to about 100 nm to less than or equal to about 250 nm, greater than or equal to about 250 nm to less than or equal to about 500 nm, or greater than or equal to about 500 nm to less than or equal to about 1 µm).

In certain aspects, the matrix 30 may be porous. The matrix 30 may have a porosity of greater than or equal to about 1% to less than or equal to about 90% or optionally greater than or equal to about 30% to less than or equal to about 60%, by way of example. Pores sizes may be greater than or equal to about 10 µm to less than or equal to 1 mm or optionally greater than or equal to about 100 µm to less than or equal to about 500 µm. In certain aspects, the matrix 30 may be substantially nonporous, by way of example.

The precursor 32 and the initiator 34 are dispersed and embedded in the matrix 30. In certain aspects, the precursor 32 and the initiator 34 may be disposed within pores of the matrix. Additionally or alternatively, the precursor 32 and the initiator 34 may be partially or fully encapsulated by the matrix 30. In certain aspects, such as where the matrix 30 includes connected pores (e.g., an open cell format), the precursor 32 and initiator 34 may be coated on internal surfaces of the matrix 30.

The thermal insulation component 16 may include the precursor 32 in an amount greater than or equal to about 5% to less than or equal to about 50% by weight of a matrix material (e.g., a thermally-insulating material) or optionally greater than or equal to about 10% to less than or equal to about 20%. The thermal insulation component 16 may include the initiator 34 in an amount greater than or equal to about 0.5% to less than or equal to about 5% by weight of the precursor 32 or optionally greater than or equal to about 1% to less than or equal to about 3%. In certain aspects, the thermal insulation component 16 may consist essentially of the matrix material (e.g., a thermally-insulating material), the precursor 32, and the initiator 34.

FIG. 1A depicts the electronics assembly 10 under normal operating conditions according to various aspects of the present disclosure. Normal operating conditions may include a first or operating temperature. The operating temperature may be any temperature less than the decomposition temperature of the initiator (e.g., less than or equal to a ten-hour-half-life temperature of the initiator). In some examples, a normal operating temperature of the first electronic component 12 is greater than or equal to about 0° C. to less than or equal to about 50° C. At the operating temperature, the precursor 32 and the initiator 34 remain unreactive such that the thermal insulation component 16 is in a first or initial state. In the initial state, the thermal insulation component 16 has a first hardness.

FIG. 1B depicts the electronics assembly 10 during a heat-generating event 40 in the first electronic component 12 according to various aspects of the present disclosure. The precursor 32 is configured to crosslink in the presence of the initiator 34 under certain temperature conditions. More particularly, at a second or event temperature, the initiator 34 may decompose (e.g., generating free radicals) and initiate crosslinking of the precursor (e.g., radical polymerization). The minimum event temperature depends on the particular initiator. In some examples, the event temperature is greater than or equal to about 50° C., greater than or equal to about 60° C., optionally greater than or equal to about 70° C., optionally greater than or equal to about 80° C., optionally greater than or equal to about 90° C., optionally greater than or equal to about 100° C., or optionally greater than or equal to about 110° C. The decomposition process is endothermic and therefore consumes all or a portion of heat from the heat-generating event 40.

FIG. 1C depicts the electronics assembly 10 after the heat-generating event 40 (FIG. 1). At least a portion of the precursor 32 and the initiator 34 (FIG. 1A) are consumed to form a crosslinked polymer 50 such that the thermal insulation component 16 is in a second or final state. The change from the initial state (FIG. 1A) to the second state (FIC. 1C) is irreversible. The precursor 32 and the initiator 34 may be substantially entirely consumed to form the crosslinked polymer 50 during or following the heat-generating event 40. However, in certain aspects, the thermal insulation component 16 in the second state may include excess precursor 32 and/or initiator 34. In the final state, the thermal insulation component 16 has a second hardness greater than the first hardness. The increased hardness provides additional physical protection to adjacent components, such as the second electronic component 14, by improving mechanical properties of the thermal insulation component 16 so that it acts as a physical barrier in addition to a thermal insulator.

The precursor 32 is a molecule that includes at least one of an acrylate functional group or a methacrylate functional group. In one example, the precursor 32 includes two or more acrylate functional groups. In another example, the precursor 32 includes two or more methacrylate functional groups. The precursor 32 molecule may be a monomer, an oligomer, or a polymer. The precursor 32 may be a linear molecule or a branched molecule.

In certain aspects, linear precursors may be monomers, oligomers, or polymers. Linear precursors may include a methacryloxypropyl terminated polydimethylsiloxane (PDMS) (CAS No. 58130-03-3); an acryloxypropyl terminated PDMS (CAS No. 128754-61-0); a poly(ethylene glycol) diacrylate (CAS No. 26570-48-9); a poly(ethylene glycol) dimethacrylate (CAS No. 25852-47-5); 1,10-decanediol diacrylate (CAS No. 13048-34-5); 1,10-decanediol dimethacrylate (CAS No. 6701-13-9); ethoxylated bisphenol A diacrylate (CAS No. 64401-02-1); ethoxylated bisphenol A dimethacrylate (CAS No. 41637-38-1); a urethane acrylate (e.g., 2-[[(butylamino)carbonyl]oxy]ethyl acrylate, CAS No. 63225-53-6); a urethane methacrylate (e.g., 2-[2-(3-prop-1-en-2-ylphenyl)propan-2-ylcarbamoyloxy]ethyl methacrylate, CAS No. 126710-08-5); an epoxy acrylate (e.g., bisphenol A glycerolate (1 glycerol/phenol) diacrylate, CAS No. 4687-94-9); an epoxy methacrylate (e.g., bisphenol A ethoxylate dimethacrylate, CAS No. 41637-38-1); or any combination thereof, by way of example. The methacryloxypropyl terminated PDMS may have a weight average molecular weight ($M_W$) of greater than or equal to about 1,000 to less than or equal to about 10,000. The acryloxypropyl terminated PDMS may have a weight average molecular weight ($M_W$) of greater than or equal to about 1,000 to less than or equal to about 10,000. The poly (ethylene glycol) diacrylate may have a number average molecular weight ($M_N$) of greater than or equal to about 3 to less than or equal to about 1000. The poly(ethylene glycol) dimethacrylate may have a number average molecular weight ($M_N$) of greater than or equal to 3 to less than or equal to 1,000. The ethoxylated bisphenol A diacrylate may have greater than or equal to 4 to less than or equal to 30 ethylene oxide (EO) units. The ethoxylated bisphenol A dimethacrylate may have greater than or equal to 4 to less than or equal to 30 ethylene oxide (EO) units. The urethane acrylate may have a weight average molecular weight ($M_W$) of greater than or equal to about 200 to less than or equal to about 10,000. The urethane methacrylate may have a weight average molecular weight ($M_W$) of greater than or equal to about 200 to less than or equal to about 10,000. The epoxy acrylate may have a weight average molecular weight ($M_W$) of greater than or equal to about 200 to less than or equal to about 10,000. The epoxy methacrylate may have a weight average molecular weight ($M_W$) of greater than or equal to about 200 to less than or equal to about 10,000.

In certain aspects, a branched precursor may be a branched monomer or a branched oligomer. Branched precursors may include an ethoxylated trimethylolpropane triacrylate (CAS No. 28961-43-5); trimethylolpropane trimethacrylate (CAS No. 3290-92-4); an alkyloyl-modified dipentaerythritol triacrylate (CAS No. 83045-0-1); an ethoxylated glycerin triacrylate (CAS No. 144086-03-3); an ethoxylated pentaerythritol tetraacrylate (CAS No. 51728-26-8); or any combination thereof. The ethoxylated trimethylolpropane triacrylate may be a monomer or an oligomer and may have greater than or equal to 3 to less than or equal to 30 EO units. The ethoxylated glycerin triacrylate may be a monomer or an oligomer and may have greater than or equal to 3 and less than or equal to 30 EO units. The ethoxylated pentaerythritol tetraacrylate may be a monomer or an oligomer and may have greater than or equal to 3 and less than or equal to 30 EO units.

The initiator 34 is configured to decompose at the event temperature. The initiator 34 may decompose in an endothermic reaction to generate free radicals that polymerize with the precursor 32 to form the crosslinked polymer 50. The initiator may have a ten-hour-life temperature of greater than or equal to about 500 to less than or equal to about 120° or optionally greater than or equal to about 70° to less than or equal to about 100°.

In certain aspects, the initiator is an azo radial polymerization initiator or a peroxide radical polymerization initiator. Azo polymerization initiators may include azo nitrile initiators, azo amide initiators, or macro azo initiators, by way of example. Azo nitrile polymerization initiators may include 2,2'-azobis(isobutyronitrile) (AIBN) (CAS No. 78-67-1) or 4,4'-azobis(4-cyanovaleric acid) (CAS No. 2638-94-0), by way of example. An azo amide initiator may include 2,2'-azobis[2-methyl-N-(2-hydroxyethyl)propionamide] (CAS No. 61551-69-7), by way of example. A macro azo initiator may include 4-azobis(4-cyanovaleric acid) polymer with alpha,omega-bis(3-aminopropyl)polydimethylsiloxane (CAS No. 158947-07-0), by way of example. Peroxide initiators may include tert-butyl peroxide (CAS No. 110-05-4); dicumyl peroxide (CAS No. 80-43-3); or 2,4-pentanedione peroxide (CAS No. 37187-22-7), by way of example.

The matrix 30 includes a thermal insulation material. The thermal insulation material may have a thermal conductivity of less than or equal to about 5 W/mK. The thermal insulation material does not chemically react with the precursor 32 or the initiator 30. The thermal insulation material may include a polymer, a natural material, a fibrous material, or any combination thereof, by way of example. Polymers may include polyurethane (e.g., polyurethane foam), polystyrene, polypropylene, silicone rubber, any copolymer thereof (e.g., polyurethane-polypropylene copolymer), or any combination thereof, by way of example. Natural materials may include cellulose, by way of example. Fibrous materials may include fiberglass or mineral wool, by way of example. In certain aspects, the thermal insulation material includes polyurethane, polystyrene, polypropylene, silicone rubber, polyurethane-polypropylene copolymer, cellulose, fiberglass, mineral wool, or any combination thereof, by way of example. In one example, the thermal insulation material includes polyurethane foam.

The thermal insulation component 16 may optionally include other non-reactive components. Non-reactive components may be dispersed and embedded in the matrix 30 or form a coating on the matrix 30, for example. In certain aspects, the thermal insulation material further includes an additive to modify its physical properties, such as silica ($SiO_2$), alumina ($Al_2O_3$), titania ($TiO_2$), or any combination thereof. In one example, silica nanopowder is added to tailor mechanical strength and flexibility of the thermal insulation component 16.

As shown in FIG. 1A, the thermal insulation component 16 may define a thickness 60 in a direction substantially perpendicular to an outer surface 62 of the first electronic component 12. The thickness 60 may be selected depending on the desired packaging and performance characteristics of the electronics assembly 10. The thickness 60 may be substantially uniform, as shown. In certain alternative variations, a thickness may be non-uniform. In certain aspects, the thickness 60 may be greater than or equal to about 1 mm to less than or equal to about 1 cm (e.g., greater than or equal to about 1 mm to less than or equal to about 200 mm, greater than or equal to about 200 mm to less than or equal to about 500 mm, or greater than or equal to about 500 mm to less than or equal to about 1 cm).

In various aspects, an electronics assembly may have one or more electronic components and one or more thermal insulation components. Furthermore, electronics assemblies may have different arrangements with the thermal insulation component remaining in thermal communication with the electronic component. With reference to FIG. 2, another electronics assembly 110 according to various aspects of the present disclosure is provided. The electronics assembly 110 includes a plurality of electronic components 112 and a plurality of thermal insulation components 116 disposed between the electronics components 112, respectively. The electronic components 112 may be similar to the electronic components 12, 14 of FIGS. 1A-1C. The thermal insulation component 116 may be similar to the thermal insulation component 16 of FIG. 1A.

Referring to FIG. 3, another electronics assembly 210 according to various aspects of the present disclosure is provided. The electronics assembly 210 includes an electronic component 212 and a thermal insulation component 216. The electronic component 212 may be similar to the first electronic component 12 of FIG. 1A. Except as described below, the thermal insulation component 216 may be similar to the thermal insulation component 16 of FIG. 1A.

The thermal insulation component 216 is disposed around an outer surface 218 of the electronic component 212. In certain aspects, the thermal insulation component 216 may extend around substantially the entire outer surface 218 to define a housing. The thermal insulation component 216 defines a thickness 220 substantially perpendicular to the outer surface 218. The thickness 220 may be uniform, as shown. In certain alternative aspects, the thickness 220 may be non-uniform. For example, the thickness 220 may be greater in regions that are adjacent to other electronic components in an assembly, and thinner in remaining regions.

In various aspects, the present disclosure provides a method of manufacturing a thermal insulation component. With reference to FIG. 4, the method generally includes providing a crosslinking precursor and a crosslinking initiator at 310, providing a matrix at 320, and embedding the precursor and initiator in the matrix at 330. The initiator is maintained at a temperature of less than a ten-hour-half-life temperature of the initiator to prevent premature rapid decomposition of the initiator and crosslinking of the precursor.

At 310, the method includes providing the crosslinking precursor and the crosslinking initiator. The precursor and the initiator may be provided as solids or liquids. When the precursor and/or initiator is provided as a solid, they may be embedded in the matrix as solids or dissolved in a solvent to form a solution prior to embedding. Suitable solvents may include dimethylformamide (DMF), dimethyl sulfoxide (DMSO), N-methyl-2-pyrrolidone (NMP), or any combination thereof, by way of example.

At 320, the method includes providing the matrix. Providing the matrix may include forming the matrix, such as when the matrix includes a foam. At 330, the method includes embedding the precursor and initiator in the matrix. The embedding may be performed sequentially (i.e., after providing the matrix) or concurrently with providing the matrix (i.e., forming the matrix). In an example of a sequential process, a solution of the precursor and the initiator in the solvent is prepared, then a porous matrix (e.g., fiberglass or cellulose) is provided, then the solution is absorbed into the porous matrix, and then the solvent is removed (e.g., by evaporation with or without heat). In an example of a concurrent process, powder precursor and initiator are provided, the precursor and initiator are admixed with a polymer foam precursor (e.g., a polyurethane precursor), and then foam (e.g., a foam pad) is prepared with the crosslinking precursor and initiator dispersed and embedded in the foam. The foam may be formed by heating the admixture to a temperature less than the ten-hour-half-life temperature of the initiator and pouring it into a metal mold for cooling. In certain aspects, pores may be formed using pore forming reagent or inert gas bubbling prior to cooling, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermal insulation component comprising:
   a matrix comprising a thermal insulation material having a thermal conductivity of less than or equal to about 5 W/mK;
   a crosslinking precursor embedded in the matrix, the crosslinking precursor including at least one of an acrylate functional group or a methacrylate functional group; and
   a crosslinking initiator embedded in the matrix, the crosslinking initiator being configured to decompose to initiate crosslinking of the crosslinking precursor at a temperature of greater than or equal to about 50° C., the crosslinking precursor and the crosslinking initiator being non-chemically-reactive with the thermal insulation material.

2. The thermal insulation component of claim 1, wherein the crosslinking precursor comprises a linear molecule selected from the group consisting of: a methacryloxypropyl terminated polydimethylsiloxane (PDMS); an acryloxypropyl terminated PDMS; a poly(ethylene glycol) diacrylate; a poly(ethylene glycol) dimethacrylate; 1,10-decanediol diacrylate; 1,10-decanediol dimethacrylate; ethoxylated bisphenol A diacrylate; ethoxylated bisphenol A dimethacrylate; a urethane acrylate; a urethane methacrylate; an epoxy acrylate; an epoxy methacrylate; or any combination thereof.

3. The thermal insulation component of claim 1, wherein the crosslinking precursor comprises a branched monomer selected from the group consisting of: an ethoxylated tri methylolpropane triacrylate; tri methylolpropane tri methacrylate; an alkyloyl-modified dipentaerythritol triacrylate; an ethoxylated glycerin triacrylate; an ethoxylated pentaerythritol tetraacrylate; or any combination thereof.

4. The thermal insulation component of claim 1, wherein the crosslinking precursor comprises a branched oligomer selected from the group consisting of: an ethoxylated tri methylolpropane triacrylate; an ethoxylated glycerin triacrylate; an ethoxylated pentaerythritol tetraacrylate; or any combination thereof.

5. The thermal insulation component of claim 1, wherein the crosslinking initiator comprises an azo initiator selected from the group consisting of: 2,2'-azobis(isobutyronitrile); 4,4'-azobis(4-cyanovaleric acid); 2,2'-azobis[2-methyl-N-(2-hydroxyethyl)propionamide]; 4-azobis(4-cyanovaleric acid) polymer with alpha,omega-bis(3-aminopropyl)polydimethylsiloxane; or any combination thereof.

6. The thermal insulation component of claim 1, wherein the crosslinking initiator is a peroxide initiator selected form the group consisting of: tert-butyl peroxide; dicumyl peroxide; 2,4-pentanedione peroxide; or any combination thereof.

7. The thermal insulation component of claim 1, wherein the crosslinking initiator has a ten-hour-half-life temperature is greater than or equal to about 50° C. to less than or equal to about 120° C.

8. The thermal insulation component of claim 1, wherein the crosslinking precursor is present in an amount greater than or equal to about 5% to less than or equal to about 50% by weight of the thermal insulating material.

9. The thermal insulation component of claim 1, wherein the crosslinking initiator is present in an amount greater than or equal to about 0.5% to less than or equal to about 5% by weight of the crosslinking precursor.

10. The thermal insulation component of claim 1, wherein the thermal insulation material comprises fiberglass, mineral wool, cellulose, polyurethane, polystyrene, polypropylene, silicone rubber, or any combination thereof.

11. An electronics assembly comprising:
    an electronic component; and
    a thermal insulation component in thermal communication with the electronic component, the thermal insulation component comprising,
        a matrix comprising a thermal insulation material having a thermal conductivity of less than or equal to about 5 W/mK,
        a crosslinking precursor embedded in the matrix, the crosslinking precursor including at least one of an acrylate functional group or a methacrylate functional group, and
        a crosslinking initiator embedded in the matrix, the crosslinking initiator being configured to decompose to initiate crosslinking of the crosslinking precursor at a temperature of greater than or equal to about 50° C., the crosslinking precursor and the crosslinking initiator being non-chemically-reactive with the thermal insulation material.

12. The electronics assembly of claim 11, wherein the thermal insulation component has a thickness of greater than or equal to about 1 mm to less than or equal to about 1 cm.

13. The electronics assembly of claim 11, wherein:
    the electronic component comprises an electrochemical cell;
    the thermal insulation material comprises polyurethane;
    the crosslinking precursor comprises a poly(ethylene glycol) diacrylate; and
    the crosslinking initiator comprises 2,2'-azobis(isobutyronitrile).

14. The electronics assembly of claim 11, wherein:
    the crosslinking precursor is present in an amount greater than or equal to about 5% to less than or equal to about 50% by weight of the thermal insulating material; and
    the crosslinking initiator is present in an amount greater than or equal to about 0.5% to less than or equal to about 5% by weight of the crosslinking precursor.

15. A method of manufacturing a thermal insulation component, the method comprising:
    embedding a crosslinking precursor and a crosslinking initiator in a matrix comprising a thermal insulation material; and during the embedding, maintaining the crosslinking initiator at a temperature of less than or equal to a ten-hour-half-life temperature of the crosslinking initiator, the crosslinking precursor and the crosslinking initiator being non-chemically-reactive with the thermal insulation material.

16. The method of claim 15, further comprising:
forming the matrix.

17. The method of claim 16, wherein the forming is performed concurrently with the embedding.

18. The method of claim 15, further comprising:
prior to the embedding, forming a solution by dissolving the crosslinking precursor and the crosslinking initiator in a solvent; and
after the embedding, removing the solvent from the matrix.

19. The method of claim 18, wherein the embedding comprises absorbing the solution in the matrix.

20. The method of claim 15, wherein the ten-hour-half-life temperature is greater than or equal to about 50° C. to less than or equal to about 120° C.

\* \* \* \* \*